(12) United States Patent
Michelsen et al.

(10) Patent No.: US 8,687,691 B1
(45) Date of Patent: Apr. 1, 2014

(54) IMAGE SLICED HIGH DEFINITION SCALABLE ARRAY ENCODING SYSTEM AND METHOD

(75) Inventors: Wayne Michelsen, Mountain View, CA (US); Jean Dumouchel, Los Gatos, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1665 days.

(21) Appl. No.: 11/405,963

(22) Filed: Apr. 17, 2006

(51) Int. Cl.
*H04B 1/66* (2006.01)
(52) U.S. Cl.
USPC ............ 375/240.08; 375/240.24; 375/240.16; 375/240.12; 382/238; 382/236; 382/243
(58) Field of Classification Search
USPC ............. 375/240.08, 240.24, 240.16, 240.12; 382/238, 236, 243
See application file for complete search history.

(56) References Cited

U.S. PATENT DOCUMENTS

| | | | | |
|---|---|---|---|---|
| 6,298,088 | B1 * | 10/2001 | Bhatt et al. ............... | 375/240.28 |
| 6,307,975 | B1 * | 10/2001 | Hosaka et al. ................ | 382/243 |
| 6,611,624 | B1 * | 8/2003 | Zhang et al. ................... | 382/232 |
| 6,980,595 | B2 * | 12/2005 | Rose et al. ............... | 375/240.13 |
| 7,692,682 | B2 * | 4/2010 | Pun et al. ................... | 348/14.08 |
| 2006/0120450 | A1 * | 6/2006 | Han et al. ................ | 375/240.03 |

* cited by examiner

*Primary Examiner* — Shawn An (57) ABSTRACT

An array encoding system and method for use with high definition digital video data streams includes method and means for analyzing the incoming data stream, splitting the data stream in accordance with video complexity or other criteria, encoding each of the subsidiary data streams in accordance with a desired encoding standard, and combining the data streams to generate an output. The encoding system and method is particularly suited to encoding data streams to provide an output with is substantially consistent with the H.264 video communications standard. The system and method are scalable.

11 Claims, 8 Drawing Sheets

HD Encoder Physical Architecture

Figure 1 HD Encoder Physical Architecture

Figure 2  Slice Encoder Physical Architecture

Figure 3  AVC Image Extrapolation Area

Figure 4  Sliced Image Extrapolation Areas

Figure 5  Decoded Image Reference and Extrapolation Areas

Figure 6 Motion Vector Constraint Techniques

Figure 7A  Logic Flow for Slice Edge Constraints

Figure 7B  Logic Flow for Prediction Result Constraints

Figure 7C  Logic Flow for Prediction Search Area Constraints

Figure 8 HD Decoder Physical Architecture

Figure 9A Standard Sliced HD Decoder w/Slice Deblock

Figure 9B Sliced HD Decoder w/Complete Image Deblock

IMAGE SLICED HIGH DEFINITION SCALABLE ARRAY ENCODING SYSTEM AND METHOD

RELATED APPLICATION

This application claims the benefit of U.S. Provisional Patent Application Ser. No. 60/671,638 filed Apr. 15, 2005, which is incorporated herein by reference in its entirety.

FIELD OF THE INVENTION

This invention relates generally to video encoding and decoding techniques, and more particularly relates to video encoding and decoding techniques compatible with the H.264 standard and extensions thereof.

BACKGROUND OF THE INVENTION

Video compression has always been an extremely difficult task that pushes the computational limits of the available hardware. The compression techniques implemented and adopted at any given time depend as much on the algorithmic science as on the practical amount of processing that can be applied to the task.

MPEG-2 has been a viable compression standard for more than a decade. In that time, the science of video compression has advanced, as has the power of computational platforms. This has led to a newly developed international standard, known as ITU-T Rec. H.264 and ISO/IEC MPEG-4 part 10. This standard represents a significant improvement over MPEG-2. The H.264 standard, also known as AVC, offers greatly improved compression efficiency, typically on the order of two to three times the efficiency of MPEG-2. But this efficiency comes at the price of processing complexity. The complexity of a typical H.264 encoder is 10 to 20 times the processing capacity of an MPEG-2 encoder.

To increase the raw useable amount of processing, the task has often been decomposed into serial or parallel operations divided up among several machines. This basic approach has been successfully implemented for MPEG-2 video compression, and specifically for HD MPEG-2 video compression. However, extending this approach to AVC reveals several unique problems that are neither obvious nor easily solved. This is particularly apparent if the AVC "Main" profile is used. Four different profiles, or levels of complexity, are contemplated by AVC. The minimal feature set is termed the Baseline profile, the Main and Extended profiles offer additional features, and the High profile offers the most robust set of features.

As was true for MPEG-2, a viable approach to video encoding in AVC is to use multiple processors, in concert, to divide the task. One of these approaches is to divide each original frame of video into several slices and assign a separate machine to encode each slice stream. Again, this approach was successfully adopted for early MPEG-2 HD video encoders. However, doing so in AVC Main-Profile or High-Profile, without the use of multiple Motion Constrained Slice Groups which are only allowed in the Extended-Profile feature set, requires the solution of many problems not previously identified or obvious.

This present invention provides a solution to these encoding problems, and describes a machine that implements solutions to these problems. Additionally, this present invention provides a companion decoder that can recognize the encoding techniques used in the present invention, and optimize its performance given the incorporated techniques.

BRIEF DESCRIPTION OF THE FIGURES

FIG. 5 shows how an AVC compliant decoder would treat the decoding of each slice and the external slice area.

SUMMARY OF THE INVENTION

The present invention provides a slice-based system and process for encoding images in a video stream compliant with an Advanced Video Coding standard, or H.264, in a manner which reduces boundary errors even where the encoding process uses the upper and lower extrapolation areas for encoding.

The system includes a video dicer which divides an image from the incoming video stream into a plurality a blocks. The blocks are then supplied to an array of slice encoders, each for encoding to an AVC standard the associated block. Upper and lower AVC extrapolation areas are also provided, although in some embodiments just one of either upper or lower extrapolation areas may be used. Each encoder operates to perform appropriate prediction of a best match between the slice being processed and a previously encoded slice, where the AVC extrapolation areas may be considered in determining the 'best match'. However, to ensure that boundary errors are minimized, the encoding process is constrained to ensure that, at the boundary, the encoded image matches the adjacent boundary. A variety of techniques may be used for such constraints, including constraining the motion vector to the image area, voiding the search result provided by the best match search, limiting the search area to the image area, and displacing the search area. Then, in at least some embodiments, the encoded slices are sequenced by an encoded image splicer.

The process includes dividing the image into a series of blocks, establishing at least one of upper and lower extrapolation areas, performing a best match prediction which includes consideration of pixel data in the extrapolation areas, and constraining the best match prediction to minimize boundary areas.

The foregoing and other features of the invention will be better appreciated from the following detailed description of the invention, taken together with the Figures.

DETAILED DESCRIPTION OF THE INVENTION

The present invention provides a multiple slice based Video Encoder which complies with the H.264 specification and achieves higher performance, in terms of compute time, throughput, video resolution and perceived video quality, than can be achieved with a conventional H.264 encoder. The encoder of the present invention implements a slice based solution which is otherwise substantially compatible with the H.264 Main profile.

Figure 1:
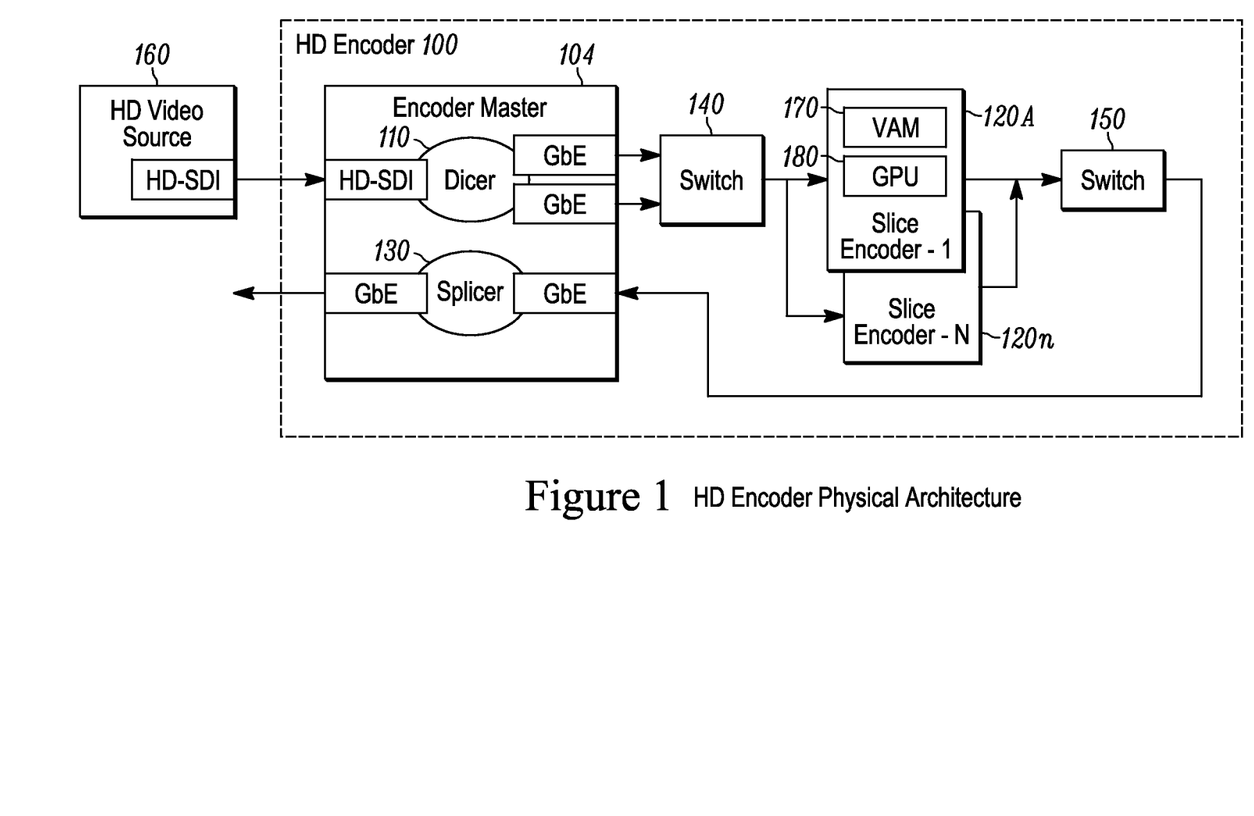
FIG. 1 illustrates a physical system level view of a slice dividing, multiple machine, HD AVC encoding system in accordance with encoding aspect of the present invention. In particular, it shows the partitioning of a video stream into constituent slices, which are then routed to individual slice encoders. This approach distributes the computational burden, in parallel, among a multiplicity of encoding engines.

Referring to FIG. 1, a multiple slice HD video encoder system 100, includes a video dicer 110, a plurality of image slice encoders 120A-n, and an encoded image splicer 130 linked by appropriate switches 140 and 150. FIG. 1 illustrates an exemplary arrangement of multiple encoding systems arranged in such a configuration, with the video dicer 110 and the encoded image splicer 130 forming an encoder master portion 104. The encoded image splicer 130 may not be included in some implementations of the invention. The dicer 110 receives a coherent original video stream 160, divides each frame into slices (as defined by the AVC specification), and distributes each slice over a channel, for example Gigabit Ethernet [GbE], to an associated slice encoder 120A-n. Each slice encoder performs a video compression operation over its assigned slice of the incoming video and produces an output data stream consistent with the H.264 video communication standard. Each slice encoder 120A-n includes a Video Acceleration Module [VAM] 170 as well as a general purpose processing unit [GPU] 180.

Figure 2:
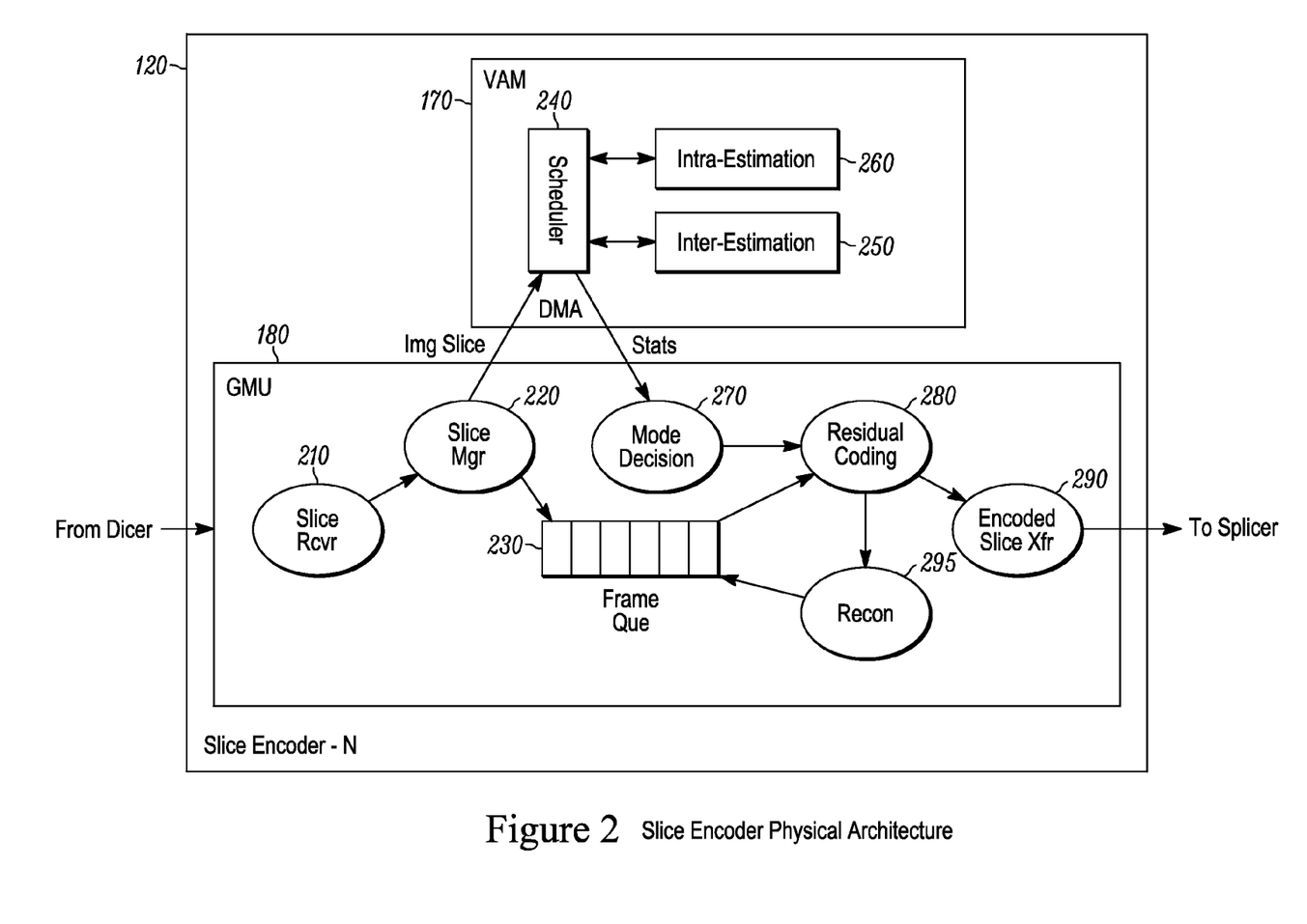
FIG. 2 illustrates a physical component view of a Video Slice Encoder in accordance with the present invention, and in particular it shows the partitioning of the computational load between a General Processing Unit running software tasks and a hardware based Video Acceleration Module performing specialized repetitive processing.

Referring next to FIG. 2, each slice encoder is comprised of a GPU 180 executing flexible software based processing, and a Video Acceleration Module 170 which comprises, in some implementations, specialized hardware performing highly efficient and repetitive operations. The VAM 170 may, in at least some implementations, be implemented as an FPGA to take advantage of the increased processing speeds that are offered by such configurations. The slice encoding operation is parsed to assign certain tasks to the VAM 170 and other tasks to the GPU 180 to optimize throughput and achieve real time processing at full frame, full motion rates. The specialized VAM processing focuses on the Intra/Inter motion prediction, while the GPU processes the slice data I/O, the prediction mode decisions, the final sub-PEL analysis, and the residual encoding. The partitioning is done in this way since the predictive search is the most computationally intensive and also the most algorithmically repetitive task in the encoding process.

From FIG. 2, the GPU portion 180 of the slice encoder 120 can be seen to include a variety of process steps, including a slice receiver 210, a slice manager 220 which receives the slice from the slice receiver 210 and provides it to a frame queue 230 as well as providing appropriate information to a scheduler 240, which forms part of the VAM 170. The VAM 170 further includes inter-estimation and intra-estimation portions 250 and 260. The scheduler then communicates the estimation stats back to a mode decision process 270. The results of the mode decision process are passed to a residual coding process 280 along with the frame queue 230, which outputs the encoded slice to a transfer process 290 and also outputs data to a recon process 295 where it is fed back to the frame queue 230.

The operation of an exemplary embodiment of a multiple slice AVC encoding system in accordance with the invention includes aspects of video data flow, process partitioning, and slice boundary error mitigation. Each of these aspects is explained in greater detail below.

One tool used in the process of AVC encoding is the notion that a current block of data in a picture is similar to another block of image data within the current frame, or in a nearby frame. A prediction estimation is done that searches for the "best match" of the current block to another block that has been previously encoded in a reference frame. A new capability has been added to AVC that allows searching of pixel information which is outside the boundary of the current image. And, the "best match" of a current block on the boundary of an image is found, surprisingly often, in this extrapolated region.

To produce minimal error decoded AVC encoded video streams, it is imperative that the encoder and decoder "agree" on the source information used. This is an important note since AVC allows the encoder to extrapolate pixel information outside the image being encoded. When the original image is sliced, as with the encoder of FIG. 1, and an independent encoder processes an individual slice, as shown in FIG. 2, that individual encoder is only aware of the slice it is encoding and treats that slice as a complete image unto itself. Thus, at the boundary of the slice, the encoder extrapolates image data and often converges on a prediction in the extrapolated area.

The decoder, however is not aware of the extrapolated region of an internal boundary associated with a particular slice encoder. Without appropriate constraints, therefore, adjacent slice encoders can produce processed image data which, when decoded, create artifacts or mismatches at the slice boundaries. These mismatches, if allowed to occur, would yield a substantially degraded and visually unsatisfying image.

Figure 3:
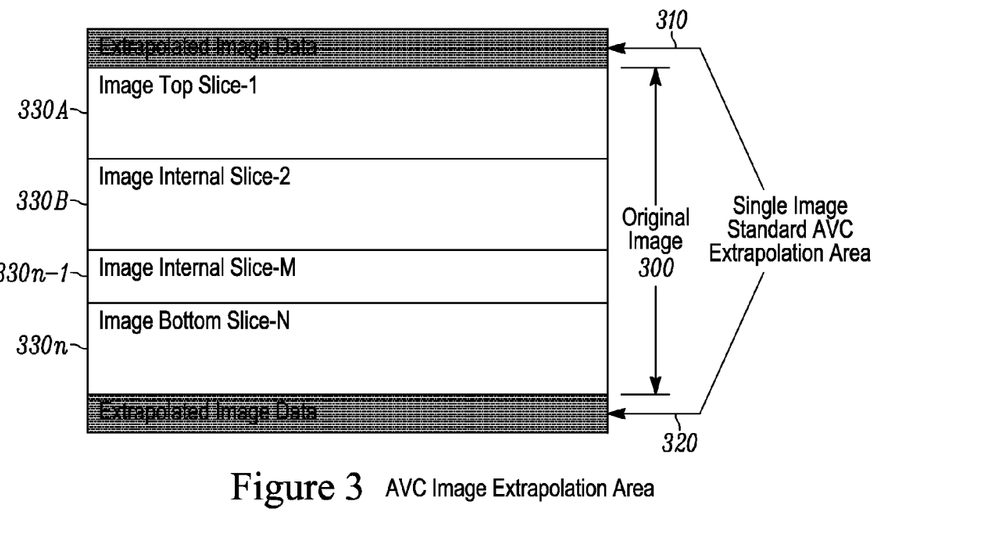
FIG. 3 shows the manner in which an HD image is partitioned for individual slice encoders. More importantly, this figure shows how the AVC standard specifies extrapolated image data outside the actual area subtended by a contiguous video image. This figure also shows how a frame of video may be divided into individual slices for independent encoding.
Figure 4:
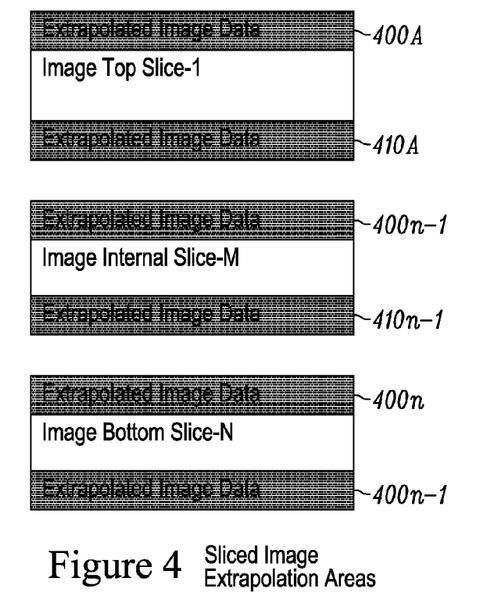
FIG. 4 shows how each slice encoder treats its respective image with respect to extrapolated image data, and shows how each slice, treated independently by its isolated encoder, would extrapolate extra-image pixel data for AVC prediction.
Figure 5:
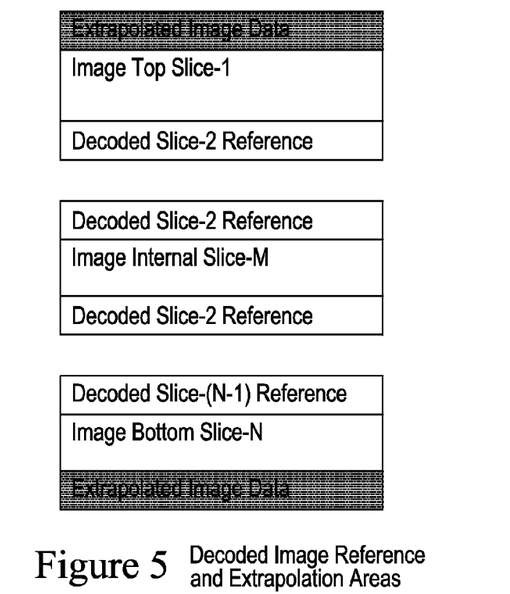
FIG. 5 depicts, in contrast to FIG. 4, the discrepancy between the extrapolated image data for each slice encoder versus the reference slice area for each slice on the AVC compliant decoder.

The issues associated with the slice encoding approach of the present invention can be appreciated from FIGS. 3-5. In FIG. 3, a single image, such as might be presented at a conventional HD video source 160 as shown in FIG. 1, includes an original image portion 300 plus a standard AVC extrapolation area 310 above the standard image, and another AVC extrapolation area 320 below the standard image. The image data, in accordance with the present invention, may be sliced into a plurality of slices 330A-n.

When the slices 330A-n are each presented to their associated slice encoder 120A-n, the slice encoder, according to the AVC standard, assumes that extrapolation areas 400A-n and 410A-n exist above and below each slice, as shown in FIG. 4. If not properly managed, the decoding process can, as shown in FIG. 5, include the original extrapolation areas 310 and 320, but the decoded slice reference areas between the adjacent slices may not match the data relied upon during encoding. As a result, the encoding process must be constrained when dealing with the boundary data to ensure that no boundary defects degrade the decoded image.

Figure 6:
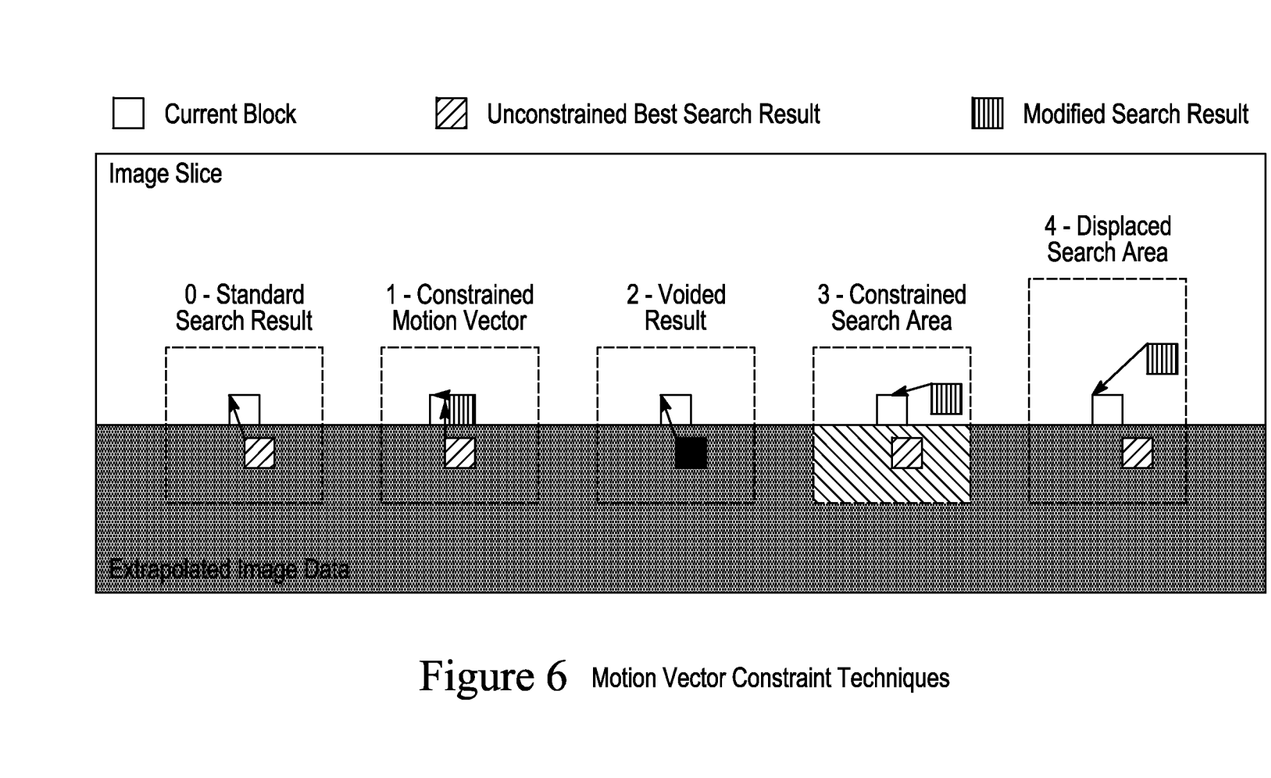
FIG. 6 shows a prediction search solution within the extrapolated image area and the various methods implemented for constraining this off-slice prediction in accordance with the present invention. In particular, to ensure that the edges of the slices match when the entirety of the image is decoded, the techniques may include either constraining the search area or modifying the result.

With reference to FIG. 6, a plurality of techniques for imposing constraints on the boundary regions of each of the slices 330A-n can be appreciated, although the specific approaches shown are exemplary and are not considered to be limiting. At the left is shown an image slice (the clear area), where the best match, as provided by a standard search result, is found in the extrapolation area (the gray area) associated with that slice. In technique 1, because the best result is found outside the image slice, the motion vector is constrained to remain within the image. In technique 2, the search result is voided. In technique 3, the search area is constrained to remain with the image. In technique 4, the search area is displaced. In this manner, the integrity of the boundary data is maintained across the slices. It will be appreciated that, although the example of FIG. 6 showed a lower extrapolation area, the same methodology applies to both upper and lower slice boundaries and their extrapolation areas, to the extent that the extrapolation data is not from areas 310 and 320.

Figure 7A:
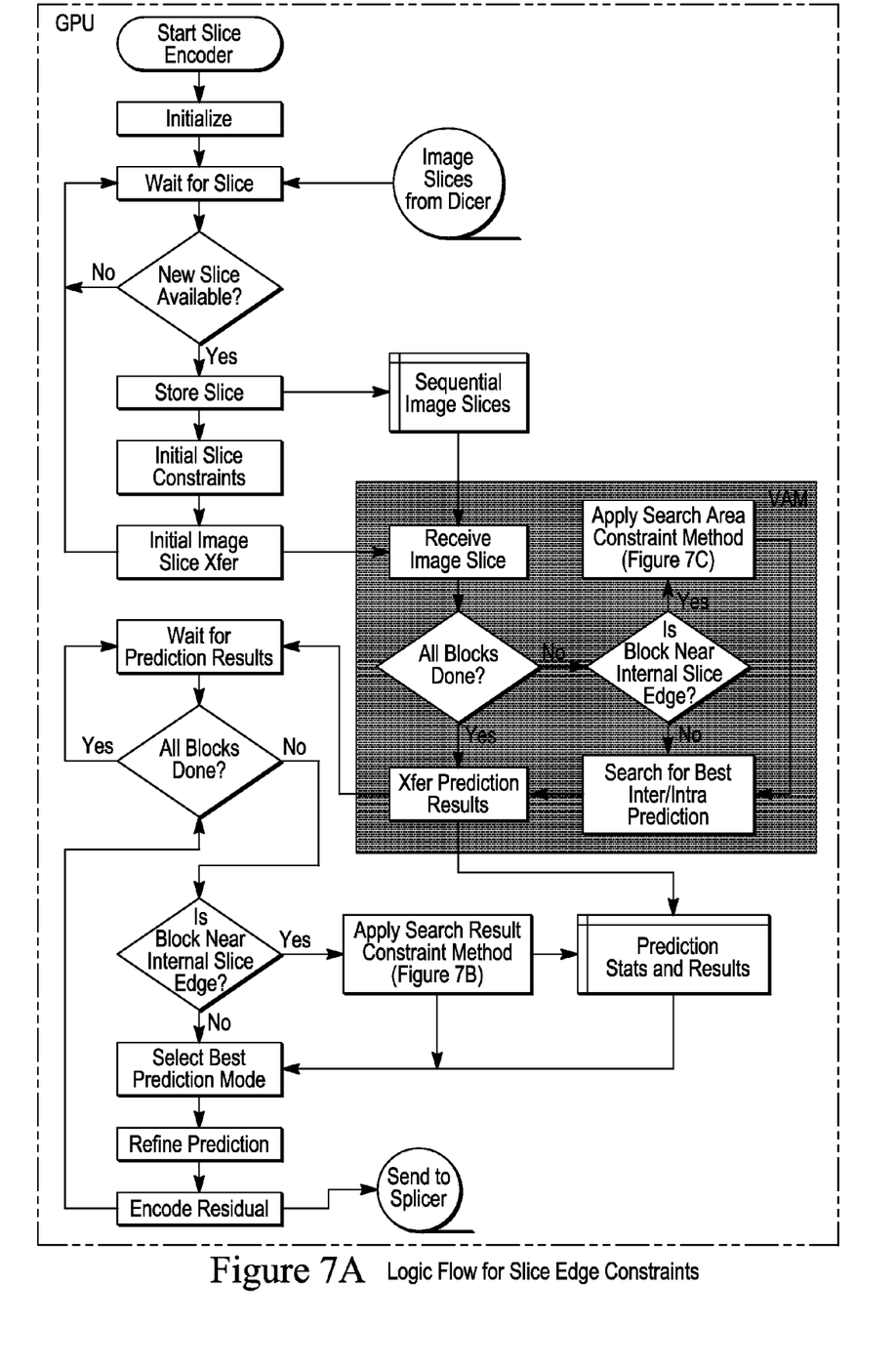
FIG. 7A shows, in flow diagram form, the process flow for the system of FIG. 1, and more particularly shows the processing of image slices in accordance with the encoding aspect of the present invention.

Referring next to FIG. 7A, the process for encoding each slice can be better appreciated. It will be appreciated that the portion of FIG. 7A shown with a gray background shows portions of the process performed in the VAM 170, while the remainder of the process is performed in the GPU 180.

Figure 7B:
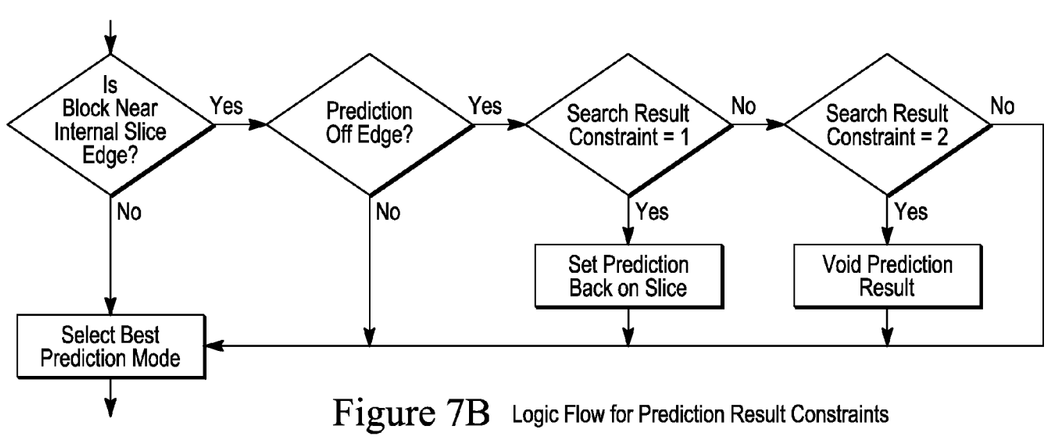
FIG. 7B shows, in flow diagram form, techniques for managing edge constraints in which the search results are constrained.
Figure 7C:
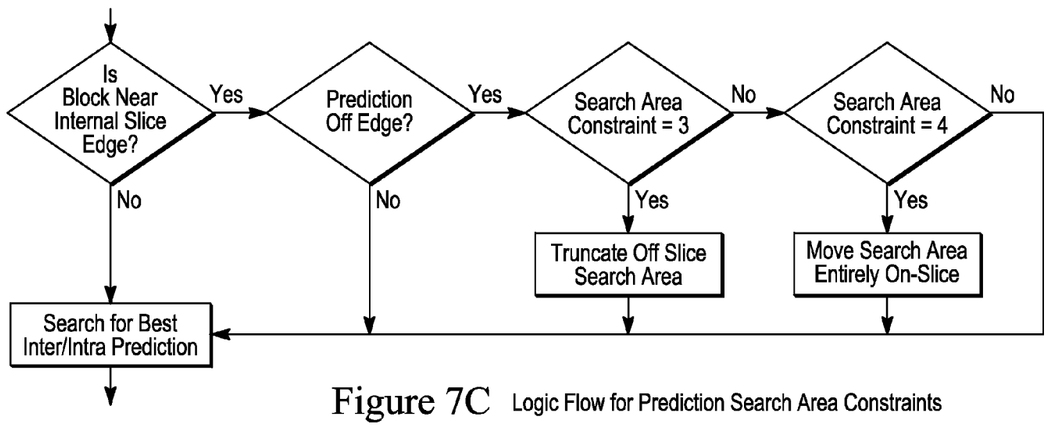
FIG. 7C shows, in flow diagram form, techniques for managing edge constraints in which the search area is constrained.

Referring next to FIG. 7B, referred to in the GPU portion of FIG. 7A, the technique of the present invention for constraining the search result can be better appreciated. Likewise, from FIG. 7C, referred to in the VAM portion of FIG. 7A, the technique of the present invention for constraining the search area can be better appreciated. It will be appreciated that these are exemplary implementations of the techniques shown in FIG. 6.

Figure 8:
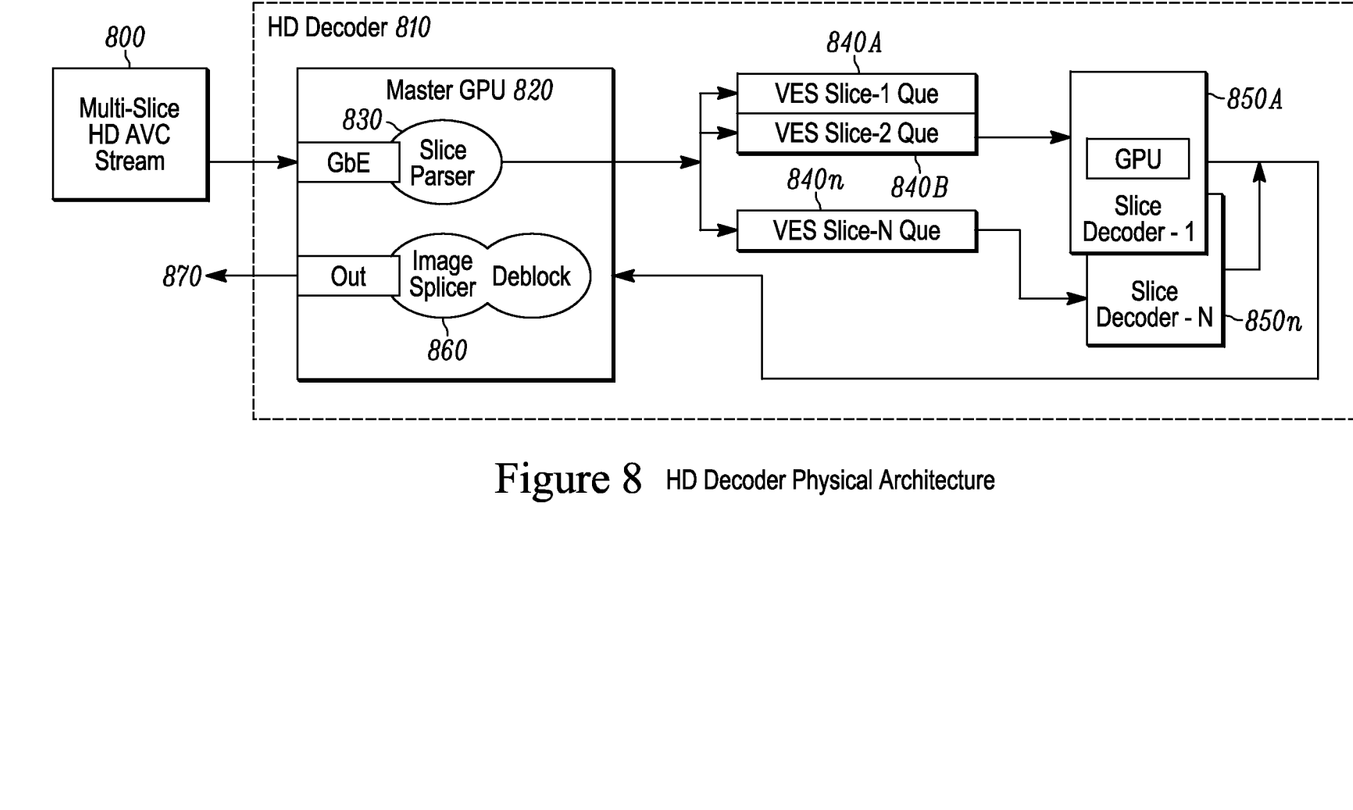
FIG. 8 illustrates a physical system level view of an HD AVC decoding system in accordance with an aspect of the invention.
Figure 9A:
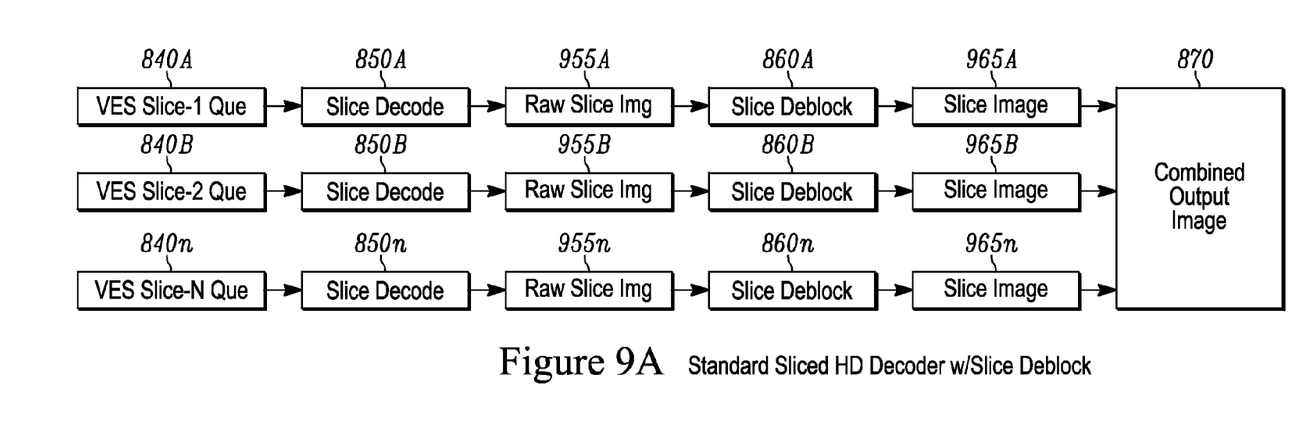
FIGS. 9A and 9B illustrate, in image data form, how the image slices are combined in a decoder of the type shown in FIG. 8 to provide the combined output image which is typically displayed as the final output, where FIG. 9A used slice deblock, while FIG. 9B uses complete image deblock.
Figure 9B:
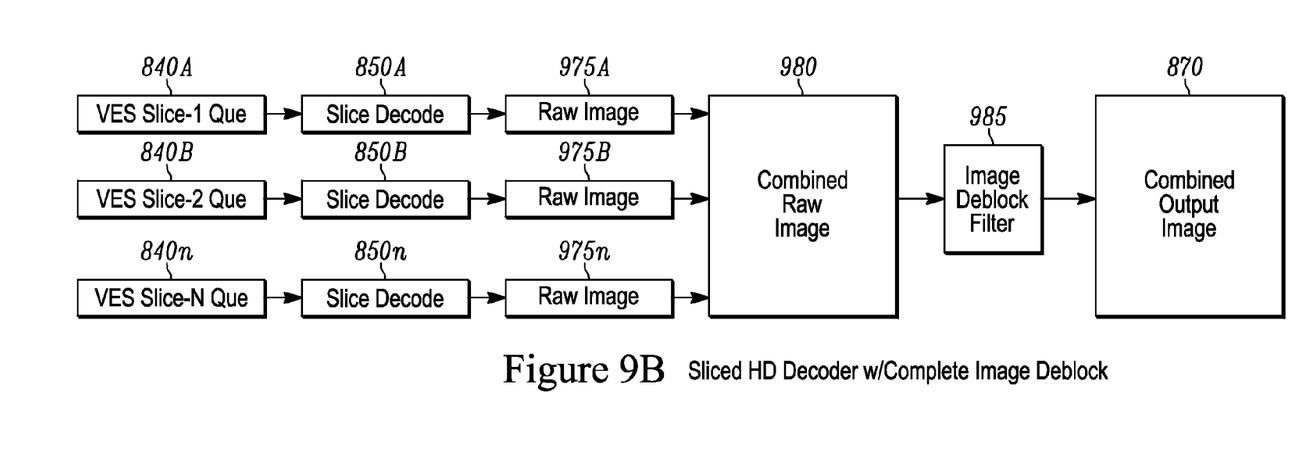

Referring next to FIGS. 8, 9A and 9B, the decoding function of the present invention can be better appreciated. A multi-slice HD AVC stream 800 is supplied to an HD Decoder 810, which includes a Master GPU 820 that includes a slice parser 830 to parse the slices and provide them to VES slice queues 840A-n, where they are supplied to slice decoders 850A-n and then provided to an image splicer and deblocker process 860 [part of the master GPU 820] to yield a combined output image 870. Shown in FIG. 9A are raw slice images 955A-n and slice images 965A-n, which form the combined output image 870. Shown in FIG. 9B are raw images 975A-n which form combined raw image 980, which is filtered by image deblock filter 985 to then form the combined output image 870. As with the encoding process, a channel of appropriate bandwidth, for example gigabit Ethernet, is provided for communication among the elements.

Having disclosed in detail a plurality of embodiments of the invention, including various aspects thereof, it will be appreciated by those skilled in the art, given the teachings herein, that the foregoing is not intended to be limiting and that numerous alternatives and equivalents either exist or will be developed which are within the scope of the present invention.

We claim:

1. A method of encoding an AVC video stream, the method comprising
    dividing an image having boundaries into a series of slices having slice boundaries,
    establishing at least one of upper and lower extrapolation areas outside the current slices,
    performing a best match prediction estimation for the current slice, including consideration of pixel information in the extrapolation area; and
    constraining the encoding to minimize error at the slice boundaries,
    wherein the best match prediction is constrained near internal slice boundaries and unconstrained near slice boundaries that are also image boundaries.

2. The method of claim 1 wherein constraining the encoding comprises one of a group comprising limiting to an image area a motion vector portion of the estimation, voiding a search result, limiting a search area to the image, and displacing the search area.

3. The method of claim 1, wherein constraining the encoding includes
    constraining encoding of the current slice to minimize error at the boundaries if the best match is found in the extrapolation areas.

4. The method of claim 3, further comprising encoding the slices and splicing the encoded slices to form an encoded image, wherein constraining encoding ensures that the boundaries of encoded slices match adjacent boundaries.

5. The method of claim 3, wherein performing a best match prediction estimation includes performing a search of an image area, and constraining encoding comprises one of constraining a motion vector to the image area, limiting a search area to the image area, voiding the search result, and displacing the search area.

6. The method of claim 3, further comprising:
    receiving a current slice;
    determining if a block of the slice is near a slice boundary; and
    applying a search constraint if the block is near the slice boundary.

7. The method of claim 6, wherein the search constraint comprises at least one of a search area constraint and a search result constraint.

8. A system for encoding an AVC video stream, the system comprising:
    a video dicer which divides an image having upper and lower boundaries into a plurality of slices having slice boundaries; and
    a plurality of slice encoders, each adapted to encode one of the slices provided by the video dicer, each slice encoder executing a best match algorithm which is constrained to minimize error at the slice boundaries,
    wherein the best match algorithm is constrained near internal slice boundaries and unconstrained near slice boundaries that are also image boundaries.

9. The system of claim 8 wherein each slice encoder further comprises a video acceleration portion.

10. The system of claim 8 wherein each slice encoder further comprises a general purpose processor.

11. The system of claim 8, the system further comprising an encoding splicer for sequencing the encoded slice data.

* * * * *